United States Patent
Nakahara

(10) Patent No.: US 7,394,572 B2
(45) Date of Patent: Jul. 1, 2008

(54) METHOD AND APPARATUS FOR PROCESSING OF HALF-TONE IMAGE

(75) Inventor: Nobuhiko Nakahara, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 681 days.

(21) Appl. No.: 10/947,657

(22) Filed: Sep. 23, 2004

(65) Prior Publication Data

US 2006/0061825 A1    Mar. 23, 2006

(51) Int. Cl.
    *H04N 1/405*    (2006.01)
(52) U.S. Cl. ........................ 358/3.2; 358/3.06
(58) Field of Classification Search ............. 358/1.9, 358/2.1, 3.06–3.2, 3.24, 3.04; 382/237
    See application file for complete search history.

(56) References Cited

U.S. PATENT DOCUMENTS 5,155,599 A    10/1992  Delabastita
5,588,094 A *  12/1996  Kroon ..................... 358/1.9
6,714,320 B1    3/2004  Nakahara et al.
2003/0197878 A1* 10/2003  Metois et al. ............. 358/1.9
2005/0275898 A1* 12/2005  Nguyen et al. ............ 358/3.09

FOREIGN PATENT DOCUMENTS

JP    2003-234900 A    8/2003

OTHER PUBLICATIONS

U.S. Appl. No. 09/595,052, filed Jun. 14, 2000, Nakahara et al.

* cited by examiner

*Primary Examiner*—Thomas D. Lee
*Assistant Examiner*—Stephen Brinich
(74) *Attorney, Agent, or Firm*—Foley & Lardner LLP

(57) ABSTRACT

In the present invention, in an image output apparatus having a specific resolution, a micro normal random number or a blue noise is synthesized in threshold matrix having a plurality of half-tone centers, having an equal interval between half-tone centers in most vicinity, and having lattice elements addressable at a rational tangent angle, wherein a growth order among half-tones is defined in a defined periodic order.

20 Claims, 13 Drawing Sheets

|  | N≥32 | | | | | | | | | | | | | | | | | |
|---|---|---|---|---|---|---|---|---|---|---|---|---|---|---|---|---|---|---|
| | 139 | 203 | 171 | 147 | 119 | 55 | 87 | 111 | 136 | 198 | 166 | 144 | 116 | 52 | 100 | 109 | | |
| | 163 | 235 | 251 | 211 | 95 | 23 | 7 | 47 | 160 | 232 | 248 | 208 | 93 | 20 | 4 | 45 | | |
| | 195 | 227 | 243 | 179 | 63 | 31 | 15 | 79 | 208 | 224 | 240 | 176 | 141 | 29 | 13 | 77 | | |
| | 131 | 235 | 219 | 139 | 139 | 127 | 71 | 39 | 103 | 128 | 232 | 152 | 125 | 68 | 132 | 100 | | |
| | 115 | 51 | 83 | 109 | 143 | 223 | 175 | 135 | 112 | 48 | 80 | 104 | 141 | 221 | 173 | 132 | | |
| | 91 | 19 | 3 | 43 | 167 | 239 | 254 | 215 | 104 | 16 | 0 | 40 | 164 | 237 | 253 | 212 | | |
| | 139 | 27 | 11 | 75 | 215 | 231 | 247 | 183 | 56 | 16 | 8 | 75 | 212 | 228 | 244 | 228 | | |
| | 123 | 67 | 35 | 99 | 135 | 191 | 223 | 15 | 120 | 64 | 32 | 96 | 132 | 189 | 221 | 141 | | |
| | 137 | 217 | 169 | 145 | 117 | 53 | 85 | 109 | 154 | 218 | 170 | 146 | 118 | 54 | 86 | 110 | | |
| N≥32 | 161 | 233 | 249 | 209 | 125 | 21 | 5 | 45 | 162 | 234 | 250 | 210 | 126 | 16 | 102 | 46 | | |
| | 209 | 225 | 241 | 177 | 61 | 29 | 13 | 77 | 210 | 226 | 242 | 178 | 62 | 30 | 14 | 78 | | |
| | 129 | 185 | 217 | 153 | 125 | 69 | 37 | 101 | 130 | 186 | 218 | 154 | 126 | 70 | 38 | 102 | | |
| | 113 | 49 | 81 | 105 | 61 | 221 | 173 | 149 | 114 | 50 | 2 | 10 | 142 | 222 | 174 | 150 | | |
| | 89 | 17 | 1 | 41 | 165 | 237 | 253 | 213 | 90 | 18 | 2 | 42 | 166 | 238 | 254 | 214 | | |
| | 57 | 25 | 9 | 73 | 213 | 229 | 245 | 229 | 58 | 26 | 10 | 74 | 213 | 230 | 246 | 182 | | |
| | 121 | 65 | 33 | 97 | 53 | 189 | 221 | 157 | 122 | 66 | 34 | 98 | 134 | 190 | 222 | 158 | | |

$+$

|  | N≥32 | | | | | | | | | | | | | | | | | |
|---|---|---|---|---|---|---|---|---|---|---|---|---|---|---|---|---|---|---|
| | 0.6 | -0.6 | 1.1 | 0.4 | 0.0 | -1.1 | -1.1 | 0.1 | -0.1 | -1.2 | 0.1 | -2.0 | -1.2 | 1.6 | -1.8 | 1.0 | | |
| | -1.5 | -0.5 | 0.5 | -1.0 | 0.7 | 0.1 | -2.0 | -0.8 | 0.6 | -1.2 | 0.5 | -0.3 | -3.2 | -1.1 | 0.6 | 0.5 | | |
| | -0.2 | -3.5 | 3.3 | -0.5 | 0.6 | 1.6 | -0.8 | 0.2 | 0.3 | -2.1 | 0.9 | -2.0 | -0.9 | -2.7 | 0.6 | 2.1 | | |
| | -0.4 | -0.1 | -1.1 | 1.1 | 2.4 | 1.5 | -2.7 | 1.4 | 1.0 | -0.5 | -1.3 | 0.9 | -3.6 | -1.4 | -0.5 | 2.2 | | |
| | -0.1 | -0.2 | -1.0 | 1.3 | -0.1 | 0.3 | 2.4 | -1.7 | -1.6 | -2.4 | -2.7 | 0.0 | 0.9 | -2.0 | 0.0 | -0.1 | | |
| | 0.4 | -1.4 | -0.3 | -0.6 | 0.8 | 0.9 | -1.2 | 2.3 | -0.9 | 0.7 | 0.7 | -2.1 | 0.0 | 0.8 | -0.9 | 1.7 | | |
| | -1.2 | -0.6 | 0.5 | 0.7 | 0.5 | -0.7 | 0.0 | -0.9 | -1.5 | -0.9 | -2.4 | 0.4 | 1.2 | -0.3 | -0.2 | 2.2 | | |
| | -1.1 | -1.6 | -1.0 | 0.9 | 0.7 | -2.7 | 2.6 | 0.5 | -1.1 | -0.7 | 0.5 | 1.0 | 0.6 | -1.5 | -1.1 | 2.9 | | |
| | -1.9 | -0.8 | -1.3 | 1.1 | 1.3 | 2.6 | -0.9 | -3.7 | 0.2 | 1.5 | -0.6 | 0.6 | 0.5 | -0.5 | -0.5 | 1.3 | | |
| N≥32 | 1.0 | 4.0 | 1.4 | 0.8 | 0.1 | 0.8 | 0.4 | 2.1 | 0.2 | -0.4 | 0.6 | -3.4 | 0.9 | 3.0 | -2.3 | 1.0 | | |
| | 0.4 | 2.6 | -2.9 | 1.4 | 1.1 | -0.5 | 0.4 | -0.6 | -0.9 | 2.5 | -0.1 | 2.4 | -0.1 | -0.4 | -2.4 | 0.5 | | |
| | 0.4 | -0.5 | -1.3 | -3.1 | 3.2 | 0.3 | -0.1 | 1.4 | -1.4 | -2.4 | -0.7 | -1.7 | 1.9 | 0.1 | 0.3 | 0.9 | | |
| | -1.5 | 2.9 | -1.2 | 0.4 | -1.5 | -0.2 | 1.4 | -0.7 | -0.8 | 0.8 | -2.3 | 0.8 | 0.0 | 1.4 | -0.5 | 1.8 | | |
| | -1.1 | 2.3 | -0.1 | -0.1 | 1.0 | 0.3 | 1.8 | -0.6 | -2.1 | -0.2 | -1.3 | -0.5 | -0.5 | -1.2 | 0.5 | -0.3 | | |
| | -1.1 | 3.2 | 1.4 | 1.9 | 0.8 | -1.9 | -0.9 | 2.1 | 0.2 | -0.9 | 0.6 | -1.1 | 2.6 | -2.0 | -1.9 | -1.8 | | |
| | -1.9 | -0.7 | 0.8 | 1.2 | 0.1 | 0.4 | -1.4 | 0.1 | -1.3 | 0.8 | 1.7 | 2.9 | -0.7 | -0.4 | -2.9 | -0.7 | | |

FIG. 6

| 111 | 127 | 177 | 217 | 142 | | | ............... | | | 142 | 198 | 19 | 164 | 187 |
|---|---|---|---|---|---|---|---|---|---|---|---|---|---|---|
| 13 | 253 | 77 | 19 | 92 | | | ............... | | | 45 | 248 | 64 | 221 | 88 |
| 160 | 208 | 50 | 156 | 195 | | | ............... | | | 74 | 173 | 104 | 136 | 37 |
| 69 | 134 | 101 | 239 | 117 | | | ............... | | | 207 | 149 | 3 | 194 | 234 |
| 175 | 29 | 190 | 5 | 47 | | | ............... | | | 89 | 39 | 225 | 57 | 119 |
| | | | | | | | | | | | | | | |
| ⋮ | ⋮ | ⋮ | ⋮ | ⋮ | | | ⋮ | | | ⋮ | ⋮ | ⋮ | ⋮ | ⋮ |
| | | | | | | | | | | | | | | |
| 114 | 25 | 152 | 190 | 79 | | | ............... | | | 221 | 138 | 209 | 49 | 192 |
| 64 | 173 | 213 | 15 | 137 | | | ............... | | | 88 | 2 | 108 | 168 | 132 |
| 246 | 86 | 48 | 117 | 250 | | | ............... | | | 155 | 245 | 69 | 27 | 205 |
| 6 | 144 | 229 | 164 | 74 | | | ............... | | | 35 | 181 | 219 | 149 | 98 |
| 60 | 196 | 30 | 103 | 52 | | | ............... | | | 112 | 81 | 123 | 43 | 233 |
F I G. 7A
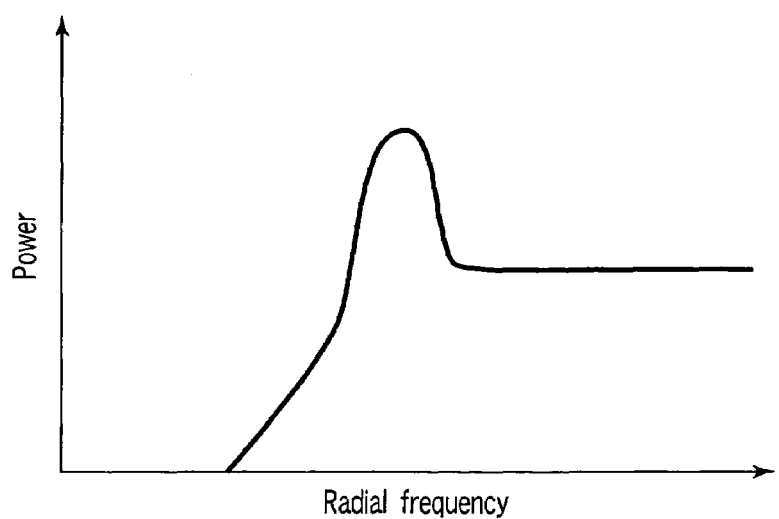
F I G. 7B

| -0.3 | 0.0 | 0.8 | 1.4 | 0.2 | | | ................... | | | | 0.2 | 1.1 | -1.7 | 0.6 | 0.9 |
|---|---|---|---|---|---|---|---|---|---|---|---|---|---|---|---|
| -1.8 | 2.0 | -0.8 | -1.7 | -0.6 | | | ................... | | | | -1.3 | 1.9 | -1.0 | 1.5 | -0.6 |
| 0.5 | 1.3 | -1.2 | 0.4 | 1.0 | | | ................... | | | | -0.8 | 0.7 | -0.4 | 0.1 | -1.4 |
| -0.9 | 0.1 | -0.4 | 1.7 | -0.2 | | | ................... | | | | 1.2 | 0.3 | -2.0 | 1.0 | 1.7 |
| 0.7 | -1.5 | 1.0 | -1.9 | -1.3 | | | ................... | | | | -0.6 | -1.4 | 1.5 | -1.1 | -0.1 |
| | | | | | | | | | | | | | | | |
| ⋮ | ⋮ | ⋮ | ⋮ | ⋮ | | | ................... | | | | ⋮ | ⋮ | ⋮ | ⋮ | ⋮ |
| | | | | | | | | | | | | | | | |
| -0.2 | -1.6 | 0.4 | 1.0 | -0.8 | | | ................... | | | | 1.5 | 0.2 | 1.3 | -1.2 | 1.0 |
| -1.0 | 0.7 | 1.3 | -1.8 | 0.1 | | | ................... | | | | -0.6 | -2.0 | -0.3 | 0.6 | 0.1 |
| 1.8 | -0.7 | -1.3 | -0.2 | 1.9 | | | ................... | | | | 0.4 | 1.8 | -0.9 | -1.6 | 1.2 |
| -1.9 | 0.3 | 1.6 | 0.6 | -0.8 | | | ................... | | | | -1.5 | 0.8 | 1.4 | 0.3 | -0.5 |
| -1.1 | 1.1 | -1.5 | -0.4 | -1.2 | | | ................... | | | | -0.3 | -0.7 | -0.1 | -1.3 | 1.6 |

METHOD AND APPARATUS FOR PROCESSING OF HALF-TONE IMAGE

BACKGROUND OF THE INVENTION

1. Field of the Invention

The present invention relates to an image processing method and an image processing apparatus capable of enhancing a quality of an image output by an image output device represented by a color printer.

2. Description of the Related Art

In recent years, an image forming apparatus (image output apparatus) of an electrophotographic system has been represented by a laser printer or the like which changes intensity of a laser beam based on digitized image data to reproduce gradation, and put to practical use. Further, in the image forming apparatus of the electrophotographic system, resolution of an output image has been enhanced, and a resolution of 600 dots per inch (dpi), 1200 (dpi) can be obtained. In the image forming apparatus of the electrophoto-graphic system, an apparatus capable of outputting a color image by arrangement of a plurality of image forming units corresponding to color components color-decomposed in accordance with subtractive primaries or repetition of an image forming process has been put to practical use.

In general, when displaying (outputting) the color image and handling image data of signal processing, an RGB system is utilized in a monitor or the like which is a part of a computer, and a CMY system or a CMYBk system to which a black signal is independently added to CMY is utilized in a printer or the like.

In an image output apparatus represented by the printer or the like, to reproduce a half-tone image, pseudo gradation (half-toning) processes such as a dither process by the use of a threshold matrix and a concentration pattern process are utilized. In this type of pseudo gradation process, binary dot on/off outputs are controlled in a certain micro area with a pixel unit or a unit obtained by further dividing a pixel to thereby represent gradation with a unit area of a portion in which dots are on (present) (area gradation).

To output the color image, in the area gradation, four colors of cyan (C), magenta (M), yellow (Y), and black (Bk) or three colors of C, M, Y are repeated, and finally superimposed on an output medium. A subtle color gradation image can be reproduced by this method. It is to be noted that, in many cases, Bk obtained by superimposing three colors of C, M, Y has a color characteristic different from that of ideal Bk. Therefore, in the color image output apparatus of the electrophotographic system, in many cases, Bk is independently added to three colors C, M, Y.

Documents, graphics, photographs and the like prepared or edited by a host computer, a personal computer and the like are converted into page description languages (PDL) such as postscript and PCL language. The converted documents, graphics, photographs and the like are supplied to the image output apparatus via relay means such as LAN and centronics.

In the image output apparatus, the language input in a controller section in an image processing apparatus disposed inside the image output apparatus or independently is interpreted, and developed into raster data correlated with a position of an actual output image (development process (RIP (process)) from the postscript or PCL language into the raster data is performed).

In general, during the RIP (process), as image data output from the controller section, image data having a gradation reproduction capability adapted to a printing capability of the output apparatus is output at 1 bit to 7 bits per pixel (color). In the RIP of 1 bit or low bit, the bit is compressed in a half-toning process section in the controller section (a compression process of the bit is performed). In the 8 bits RIP (process), the bit is not compressed in the half-toning process section of the controller section, and the gradation is reproduced by modulation (pulse width modulation or power modulation) of the intensity of the laser beam on the side of an engine (output apparatus). From a viewpoint of image quality, in principle, when the number of bits of the RIP increases, there is a high possibility that a high-quality image can be reproduced.

Various systems have heretofore been proposed as an algorithm of the half-toning process which largely influences the image quality. The algorithm of the half-toning process is largely classified into AM modulation (periodic modulation) and FM modulation (frequency modulation). In the AM modulation, a size of a half-tone dot having a basic size is modulated with a given period, angle, and shape for each gradation, and the gradation is reproduced. The FM modulation is a system in which an average distance between the half-tone dots each having a magnitude (size) fixed for each gradation is changed to reproduce the gradation. A broadly known error diffusion process is also regarded as one type of FM modulation in some case.

When these methods are applied to the image output apparatus of the electrophotographic system, the following problems occur.

In the image forming apparatus of the electrophotographic system, it is difficult to form a single pixel (e.g., 600 dpi) in a stable state equal to the resolution of a printer (one dot of 600 dpi is reproduced with the printer of 2400 dpi). Therefore, it is known that the image is degraded with use of the dither matrix of the FM modulation type. Therefore, in many image forming apparatuses of the electrophotographic systems, a method has been broadly adopted in which the area gradation is reproduced by a unit obtained by integrating a plurality of pixels using the dither matrix of the AM modulation type. It is to be noted that various methods exist in the form of round dots type, line screen type, chain type as the dither of the AM modulation type. However, the methods are essentially the same in that a plurality of dots are fixed in an arbitrary direction to reproduce the gradation.

Here, to enhance a pseudo gradation number with respect to an arbitrary image to such an extent that the image is visually satisfactory, a basic size of a half-tone dot in the threshold matrix may be set to be large. However, the larger the basic size of the half-tone dot is, the lower the resolution becomes. That is, the resolution disagrees with the gradation in the half-toning process. Therefore, when the half-toning process is performed, and when the gradation is of a satisfactory degree, the image quality is greatly degraded in an edge portion of drawings having the gradation in the image and/or line-like images indicating resolution information.

The resolution which can be output by the image forming apparatus of the electrophotographic system is about 1200 dpi at maximum. This resolution is very low as compared with the printer or the like having a resolution of several thousand dpi. Therefore, to prepare the half-tone dot and reproduce the gradation with respect to an arbitrary angle and line number (about 100 to 200 lines per inch), there is an excessively large geometric restriction, thus the resolution is not suitable for practical use.

It is possible to forcibly prepare a screen while ignoring a geometric position error in digital calculation (development into the raster data). However, when the half-toning is performed using the threshold matrix prepared by the above-described method broadly used in the printing method in the image forming apparatus of the electrophotographic system, many textures are generated with an arbitrary gradation. When many textures are generated due to the influence of many geometric errors of half-tone centers in positions on a two-dimensional plane of an image output onto a final output medium, the textures are visually conspicuous, and a granularity increases (the image quality deteriorates).

As methods for enhancing precision in forming the half-tone dot and visually satisfying the gradation, U.S. Pat. No. 5,155,599 and Jpn. Pat. Appln. KOKAI Publication No. 2003-234900 are known.

In U.S. Pat. No. 5,155,599, a square tile is used for preparing a screen whose angle or line number are closely approximated. A tile parameter (of the square tile) determines the number of half-tone dots included in the tile, and places of the dots. The half-tone dot centers are virtual, in that they are not necessarily positioned on lattices of the images output by the printer. The (virtual) half-tone dot center is used for producing the threshold matrix. That is, when the half-tone dot (virtual) grows from the vicinity of the center of the half-tone dot in the process of calculation of the threshold matrix, the half-tone dot is prepared in the dot position on the output device. In other words, the threshold matrix is set in such a manner that the dot position of the output image formed by the output device is superimposed upon a virtual center position of the half-tone dot. At this time, the dot growth (on the output device) is dithered in order to foresee a level at which coverage (superimposition of the dot position upon the virtual center position) more easily occurs. Therefore, the half-tone dot is not synchronized with the dot growth (on the output device). Instead, the respective half-tone dots are independently grown in a predetermined order.

In Jpn. Pat. Appln. KOKAI Publication No. 2003-234900, and in the ordering described in U.S. Pat. No. 5,155,599, a second virtual half-tone dot center is used, and set to be asymmetric with respect to a periodic duplicate of the first virtual half-tone dot center. In another example, an aggregated distance function is used in the ordering from the virtual half-tone dot center in each virtual half-tone dot center. The aggregated distance function is calculated by using each distance obtained by raising a sum of inverse numbers of distances to the respective virtual half-tone dot centers which have not been already included to a positive power. It has been reported that, in this case, the virtual half-tone dot center having one of minimum values of the sum of the inverse numbers is selected as the next virtual half-tone dot center during the ordering. It has been described as a further example that to define the virtual half-tone dot center of a color different from one selected color, the aggregated distance function used in obtaining the center of the virtual half-tone dot of the selected color is used. Thus, in U.S. Pat. No. 5,155,599 and Jpn. Pat. Appln. KOKAI Publication No. 2003-234900, the problems of the restriction on a geometric shape and the generation of the textures are avoided by a technique referred to as the virtual half-tone dot.

However, in the image forming apparatus of the electrophotographic system, whose outputtable resolution is about 1200 dpi at maximum, phase shifts caused by digital restrictions on a two-dimensional space by the virtual half-tone dots described in U.S. Pat. No. 5,155,599 and Jpn. Pat. Appln. KOKAI Publication No. 2003-234900 cannot be ignored. Therefore, there has been a problem that the subtle periodic shift of the half-tone dot center is visually detected, and roughness or granularity of the image is recognized.

BRIEF SUMMARY OF THE INVENTION

An object of the present invention is to provide an image processing apparatus which solves the above-described problems and which is capable of improving instability in forming an image, such as roughness or texture, without any restriction on gradation number.

According to the present invention, there is provided an image processing apparatus which converts a continuous gradation image into image data of M ($M \geq 2$) values by a 1 to N ($N \geq 1$) pseudo half-tone process by the use of a threshold matrix, comprising:

the threshold matrix has a plurality of half-tone centers;

each of the half-tone centers has an equal interval from a closest half-tone center and is the threshold matrix having lattice elements which are addressable at a rational tangent angle; and a growth order among half-tones is established by synthesizing micro inhomogeneous components with respect to the threshold matrix of super cells defined in a defined periodic order to set threshold values again.

Moreover, according to the present invention, there is provided a color image processing apparatus which converts a continuous gradation color image into image data of M ($M \geq 2$) values by a 1 to N ($N \geq 1$) pseudo half-tone process by the use of a threshold matrix for each color component, comprising:

the threshold matrix of an arbitrary color has a plurality of half-tone centers;

each of the half-tone centers has an equal interval from a closest half-tone center and is the threshold matrix having lattice elements which are addressable at a rational tangent angle;

a growth order among half-tones is established by synthesizing micro inhomogeneous components with respect to the threshold matrix of super cells defined in a defined periodic order to set threshold values again; and the rational tangent angle differs with each color.

Furthermore, according to the present invention, there is provided a color image processing apparatus comprising:

a color conversion section which converts an input color signal into a color signal suitable in forming an output image onto an output medium;

a black signal production section which extracts a component for use in reinforcing black from the signal converted into the color signal suitable in forming the output image onto the output medium by the color conversion section to produce each color signal obtained by removing the extracted component;

a gamma conversion section which corrects gradations of the component extracted to reinforce the black by the black signal production section and each color signal in accordance with an output characteristic of a device for use in forming the output image; and a pseudo gradation processing section which successively grows a threshold matrix including a plurality of half-tone centers, having an equal distance between closest half-tone centers, and having lattice elements addressable at a rational tangent angle and which synthesizes micro inhomogeneous components with an arbitrary threshold value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a schematic diagram showing an example of a method in which the threshold matrix shown in FIG. 4C is synthesized with the superposition components (normal random numbers) shown in FIG. 5A;

FIG. 7A is a schematic diagram showing an example of a threshold matrix including a blue noise synthesized into the threshold matrix shown in FIG. 4C;

FIG. 7B is a schematic diagram showing an example of a frequency characteristic of the superposition component (blue noise) shown in FIG. 7A;

FIG. 7C is a schematic diagram showing an example of a result of conversion of the threshold matrix shown in FIG. 7A into a numeric value range numerically synthesizable (in the same manner as in the normal random number described with reference to FIG. 5A);

FIGS. 12A and 12B are schematic diagram showing an example of a rule for use in the steps shown in FIGS. 11A to 11I.

DETAILED DESCRIPTION OF THE INVENTION

An embodiment of the present invention will be described hereinafter with reference to the drawings. It is to be noted that here an image output network (printing system) including a printer device of an electrophotographic system will be described as an example.

Figure 1:
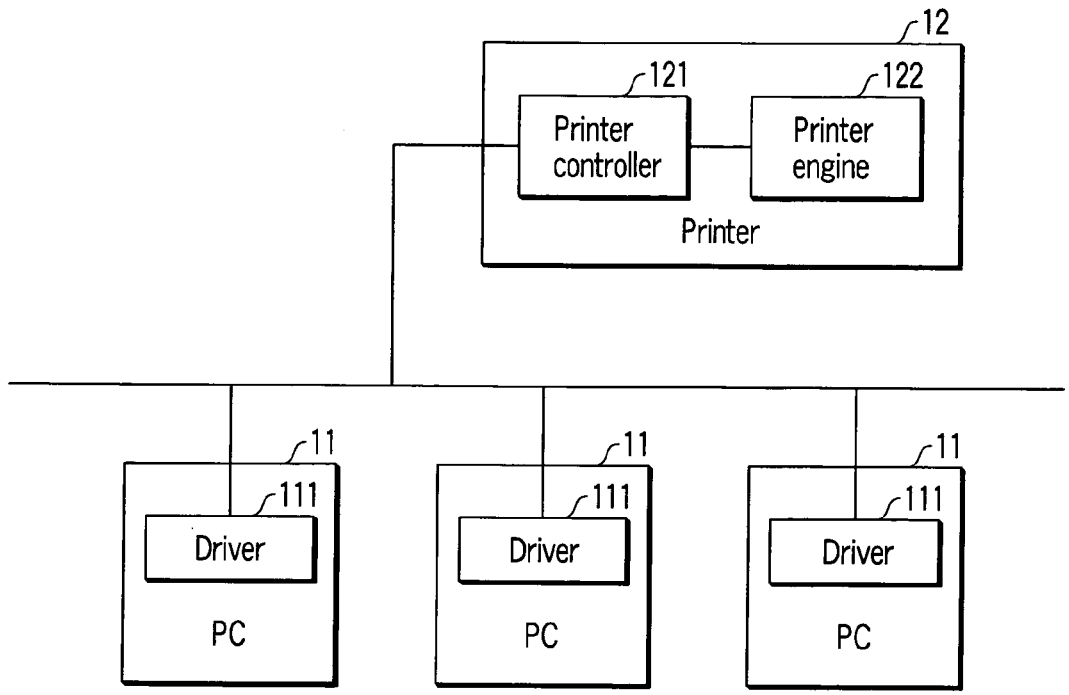
FIG. 1 is a schematic diagram showing an example of an image output network (printing output system) to which an embodiment of the present invention is applicable.

FIG. 1 shows an example of a printing system, that is, the image output network. A network 1 is connected to a plurality of computer terminals (PCs) 11 and a printer device 12.

In the above-described network 1, an arbitrary PC 11 transfers page description language (PDL) data indicating a structure of image data to the printer device 12. Examples of the PDL data include postscript, PCL language and the like.

In detail, a driver 111 of the arbitrary terminal 11 supplies the PDL data (code) to a printer controller 121 in accordance with interface characteristics of the printer device 12. Raster data is sometimes supplied in accordance with the interface characteristics of the printer device 12 (case where RIP (processed) data is supplied to the printer device 12 on the side of the PC 11).

In the printer device 12, a printer engine, that is, image forming section 122 is operated by the printer controller 121. Although not described in detail, the device has: a belt-shaped or cylindrical image carrier on which, for example, a photosensitive layer is formed; an image forming section including developing devices arranged in a predetermined order with respect to the image carrier, or in a predetermined order around the image carrier; and a fixing device for fixing an image of a developer formed on the image carrier, that is, an image to be output onto a transfer material such as a sheet or a resin film which is a final output medium. The developing device contains toners divided into color components color-decomposed in accordance with subtractive primaries, that is, four colors of cyan (C), magenta (M), yellow (Y), and black (Bk) disposed to reinforce black, and visualizes an electrostatic image formed on the photosensitive layer. The fixing device has a structure in which, for example, two roller members are provided, at least one roller is heated by a heating device for heating the toner at a temperature capable of melting the toners, and the transfer material supporting the toners (toner images) is guided between the rollers.

The printer controller 121 develops a page description language (such as PDL) which is coded image data supplied from the arbitrary computer terminal 11, for example, into bit-mapped data (raster data), and stores the data into an image memory (not shown). When the page description language is developed into the bit-mapped data (raster data), pre-designated (or requested) predetermined image processing is performed. A step (development process from the postscript or the PCL language into the raster data) in which the page description language is interpreted and developed into the raster data having correlation with an actual output image position is referred to as RIP.

The image forming section (printer engine) 122 produces an image signal corresponding to the bit-mapped data (raster data) from the printer controller 121, modulates intensity of laser light by the image signal to guide the signal to the image carrier, for example, in a case where a laser exposure device is used, and forms the electrostatic image on the photosensitive member. In a case where the exposure device is, for example, an LED array or the like although not described in detail, an LED pixel in an arbitrary position is turned on/off based on image data, and a latent image is formed on the image carrier.

It is to be noted that the terminal 11 and the printer 12 do not have to be connected to the network, parallel connection represented by centronics may be used, and one-to-one correspondence may be set. An interface between the printer controller 121 and the printer engine 122 basically depends only on the architecture of the printer, and is not especially restricted.

Figure 2:
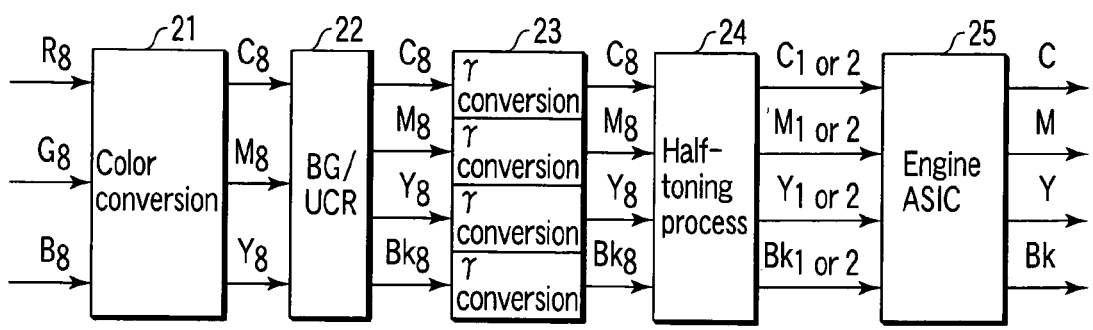
FIG. 2 is a schematic diagram showing an example of a printer section (printer device) incorporated in a printing system shown in FIG. 1.

FIG. 2 is a block diagram showing an example of an image processing section which processes a color image developed into the raster data in the printer 12 shown in FIG. 1.

As shown in FIG. 2, the printer controller 121 has a color conversion process section 21, a BG/UCR process section 22, a gamma conversion section 23, and a half-toning (pseudo gradation) process section 24. The printer engine 122 has an engine application-specific integrated circuit (ASIC) 25 to output a driving signal which turns on/off the LED pixel in the predetermined position based on the image data in a case where an LED array or the like is used to output a pulse signal which drives a laser device in accordance with the image data.

A concrete flow of the image data will be described hereinafter. It is to be noted that in the present embodiment, an input gradation will be described as 8 bits for each color, that is, 256 gradations. It is also assumed that white (no color value) is 0, and each color solid is 255.

For example, input red (R), green (G), blue (B) signals of 8 bits for each color, standard in a monitor or the like, are converted to C, M, Y signals for use in reproducing the colors in the printer by the color conversion process section 21.

In the black generation (BG)/under color removal (UCR) process section 22, a component (ink component) synthesized into "black" in subtractive primaries is extracted from the converted C, M, Y signals, and C, M, Y color values and a Bk component for reinforcing the black are obtained (the C, M, Y signals are converted into C, M, Y, Bk signals in the black generation (BG)/under color removal (UCR) process section 22).

The respective color signals of C, M, Y, Bk converted in the BG/UCR process section 22 are gradation-corrected for each color based on an inherent output characteristic of the printer device 12 by the gamma conversion section 23 ("γ characteristics" of the respective color signals of C, M, Y, Bk are corrected).

The respective color signals of the colors C, M, Y, Bk, whose γ characteristics have been corrected, are converted into image data in which each color number bit and smaller gradation number corresponds to an image output (printing) capability (characteristic) of the printer device 12 for each pixel by a half-toning process using threshold matrix for each color in the half-toning (pseudo gradation) process section 24.

In the example shown in FIG. 2, an RIP resolution is set to two modes of 600 dpi/1 bit (binary) and 600 dpi/2 bits (four values). Especially, in 600 dpi/four values, an interface connected in a parallel 2-bit constitution is constituted with respect to the engine ASIC 25. It is to be noted that in the present embodiment, 0 is off and 1 is on in a binary state, and the pixel is formed at the time of 1 (on).

The engine ASIC section 25 converts the image data input from the controller 121 into a pulse width modulation (PWM) signal for driving a laser, and applies the laser beam whose intensity is changed in accordance with the image data to the photosensitive layer of the image carrier to form the latent image on the photosensitive layer.

Details of the half-toning process section 24 which is a main aspect of the present invention will be described hereinafter. In the present embodiment, the half-toning process of 600 dpi/1 bit will be basically described.

First, the half-toning process using the threshold matrix will be described.

The half-toning process is a process performed based on a very simple logic which determines whether to turn on/off the pixel based on a result of comparison of size with the threshold value in the position corresponding to the input image data in a one-to-one correspondence.

Figure 3A:
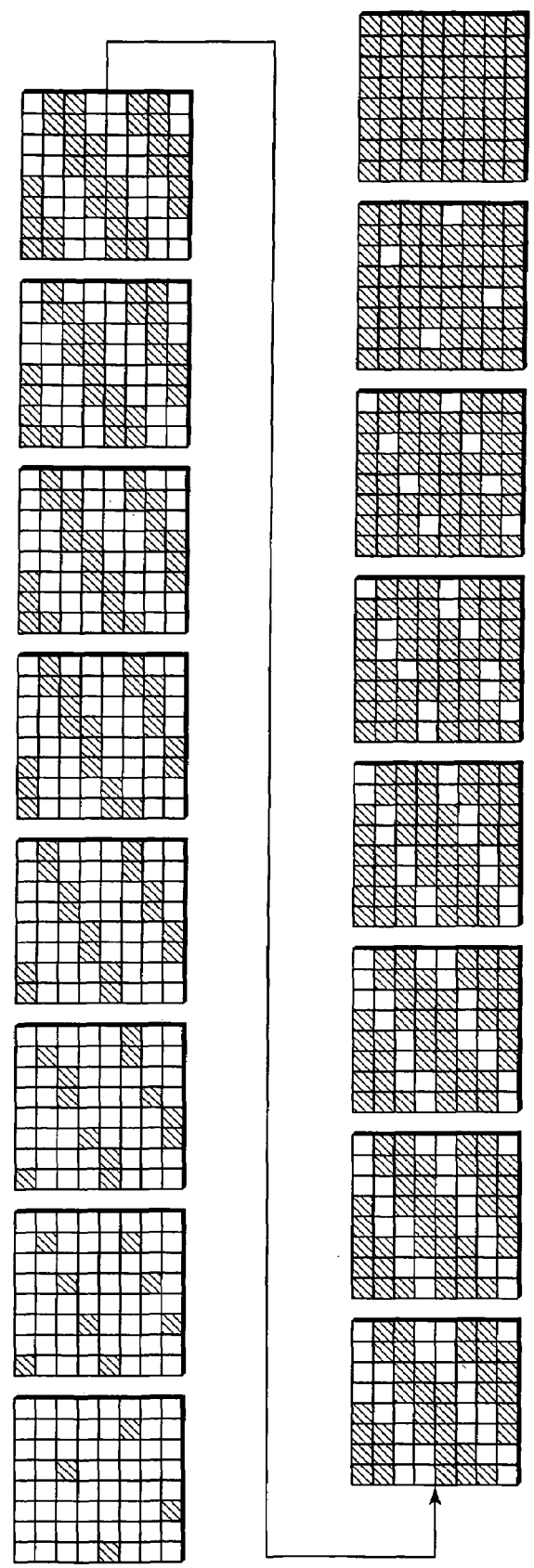
FIGS. 3A and 3B are schematic diagrams showing types of Halftoning or Halftone processes in a general printer device and one example of gradation display.
Figure 3B:
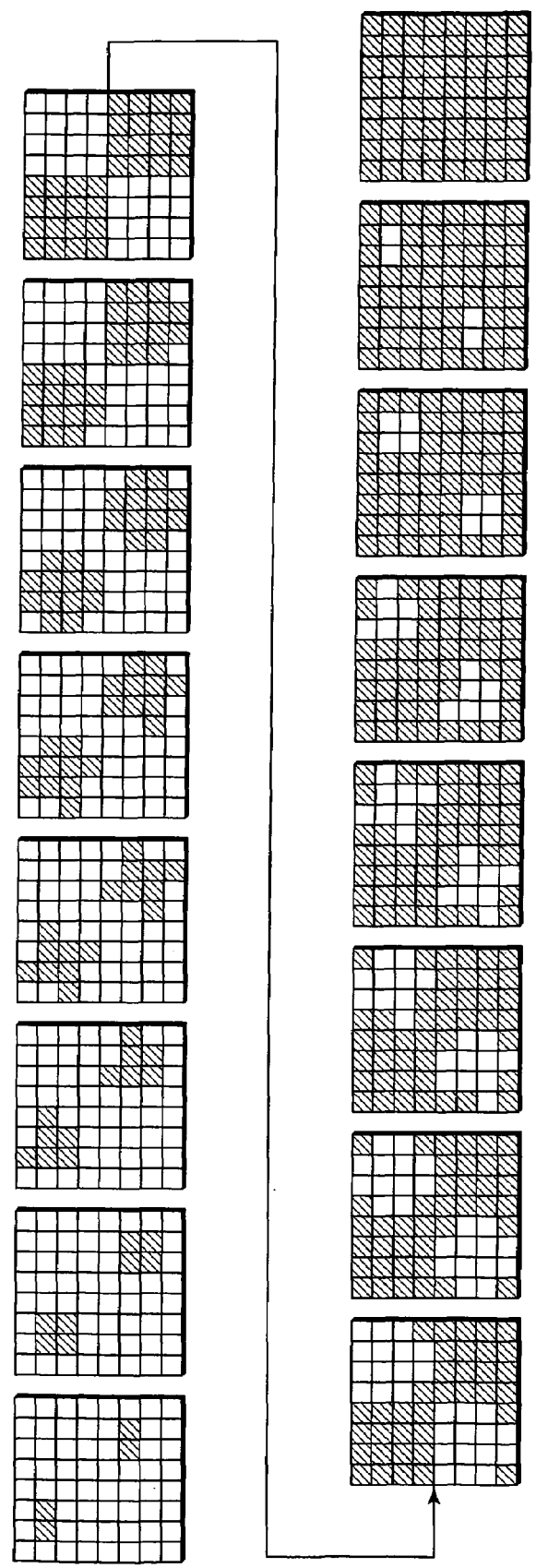

FIGS. 3A and 3B show transition of an appearance state of the pixel in each input gradation determined by the half-toning process using two types of greatly simplified threshold matrixes. It is to be noted that patterns for 16 gradations are shown in order to facilitate understanding of the description (in general, if 256-gradation pseudo half-toning process is performed with respect to an input 8-bit image, dither threshold values have 255 different threshold values, and 256 types of output patterns are obtained. The size is larger than a matrix size, but essentially equal to 16 gradations).

FIG. 3A shows an example of a conversion result of the half-toning process by the threshold matrix having such a property that the output pattern is of a line screen type. FIG. 3B shows an example of the conversion result of the half-toning process by the threshold matrix having such a property that the output pattern indicates (a grid of) dots.

As shown in FIG. 3A, although the pattern is referred to as the line screen (type), the line screen is not constituted in all regions of the highlight section in the binary pseudo half-tone process, an isolated dot(s) appears in the highlight section, and the line screen is gradually formed. Similarly in the round dots shown in FIG. 3B, isolated dots first appear, and gradually grow as a net. Additionally, if about 256 gradations are reproduced in one half-tone dot at a resolution of about 600 dpi, there is a problem that the line number drops to 50 lines per inch (1 pi). Therefore, the number of the gradations constituted in one half-tone dot is reduced, and a cluster is expanded to thereby secure the gradation number in a pseudo manner. The concept of a method of expanding the cluster is essentially the same even in the line screen (type).

Figure 4A:
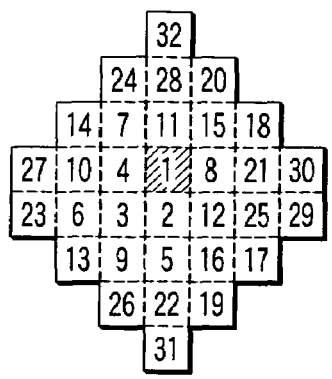
FIGS. 4A to 4C are schematic diagrams showing super cells (half-tone units) for use in the gradation process of the printer device shown in FIG. 2, threshold matrix, and one example of arrangement of the threshold matrix.

FIG. 4A shows a half-tone unit for use in preparing a basic threshold matrix having a well known growth order. An example shown in FIG. 4A is a half-tone of a round dots type. Concretely, in a pattern which becomes solid when all 32 dots are on, a center is set to "1", 2 to 4 dots are arranged, 4 dots constitute a center, and thereafter 32 dots are arranged in order.

Figure 4B:
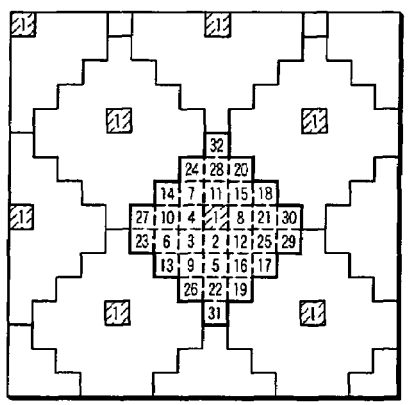

The basic threshold matrix of FIG. 4A is developed into a rectangular threshold matrix so that the half-tone process can be performed in a digital manner as shown in a tile pattern of FIG. 4B. The pattern of FIG. 4B is obtained by combination of basic half-tones in such a manner as to obtain one period in which the half-tone process can be performed by a digital repeated address calculation process (periodic patterning) in a case where the basic half-tone shown in FIG. 4A is formed into the tile pattern. A size of the tile pattern is geometrically determined based on the shape of the half-tone unit. From FIG. 4B, the threshold matrix is given each half-tone center (a minimum value ("1") in a half-tone unit in a hatched portion in the figure). Each half-tone center has an equal interval between closest half-tone centers, and constitutes the threshold matrix having lattice elements which can be addressed by a rational tangent angle. In the pseudo gradation method of the present embodiment, the dot is not a virtual half-tone dot, and a half-tone unit gradation whose positions are completely defined is obtained in a digital calculation process. The halftone unit is not limited to the half-tone dot, and the threshold matrix of a line screen (type) or another form type may be constituted.

Concerning preparation of standard half-tone dots according to the present embodiment, when line number, angle, and shape of the half-tone dot are determined, a growth order is automatically determined having the half-tone center whose address can be calculated in the digital calculation. When the gradation number is expanded beforehand based on the threshold value of the basic half-tone at this time, basic gradation number is preferably increased using a method of expanding the cluster in the same manner as in the bayer type.

Figure 4C:
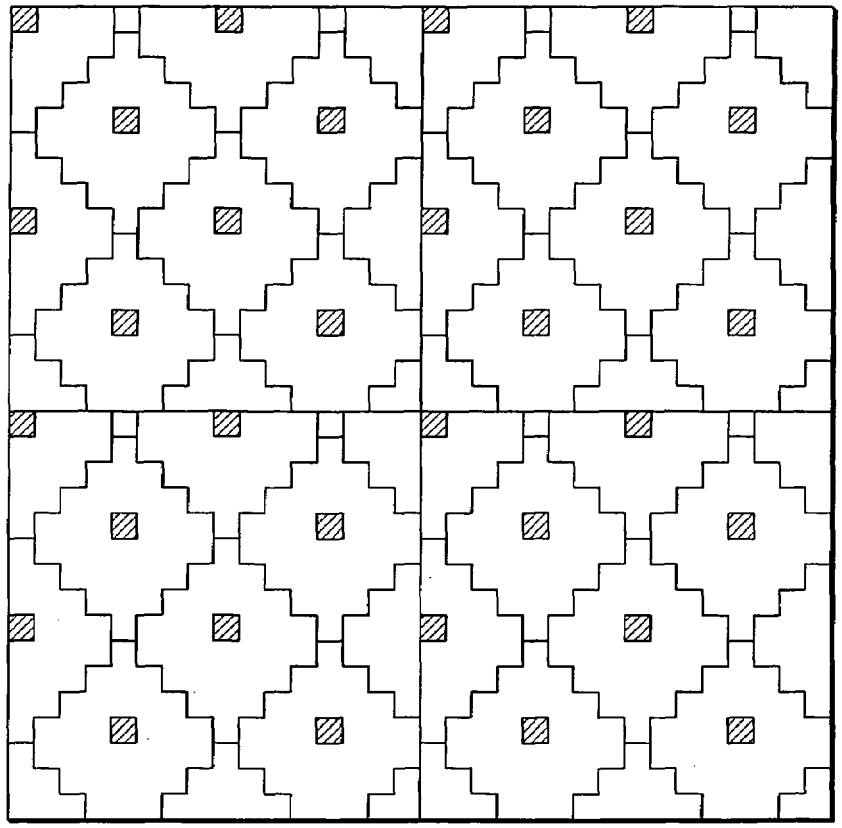

FIG. 4C shows an example in which the tile pattern shown in FIG. 4B is expanded twice in a main scanning direction (first direction) and a sub-scanning direction (second direction) crossing the first direction at right angles. In FIG. 4C, the sizes in the main scanning and sub-scanning directions are 32×32. This size may be increased. Needless to say, when the shape of the basic half-tone unit is different from that of the example of FIG. 4A, the size of the expanded threshold matrix also differs.

In the present embodiment, further for a purpose of adding a random component, the size of the threshold matrix is expanded. The expanding of the size of the threshold matrix is useful for inhibiting an image quality from being degraded in a case where the random component is added. That is, for example, when the size of the threshold matrix is larger than about 32×32, occurrence of periodicity is visually reduced in an actual output image (printing) surface.

Figures 5A, 5B:
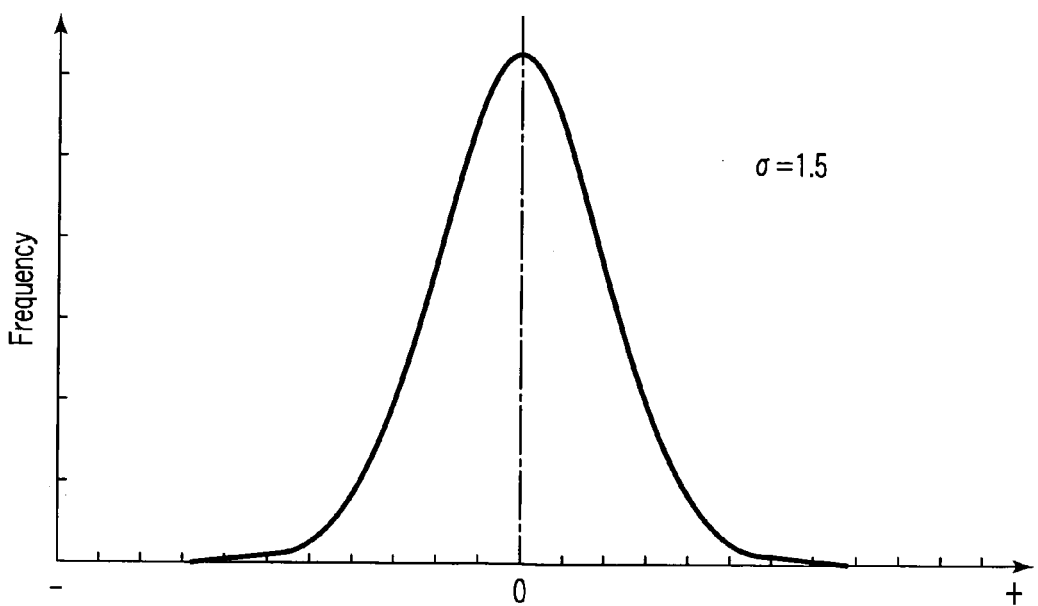
FIG. 5A is a schematic diagram showing an example of a superposition component (normal random number) synthesized into the threshold matrix shown in FIG. 4C.
FIG. 5B is a schematic diagram showing an example of distribution of the superposition components (normal random numbers) shown in FIG. 5A.

FIG. 5A shows an example of a normal random number corresponding to the size of the threshold matrix (32×32) shown in FIG. 4C. The normal random number is a random number having a normal distribution shown in FIG. 5B. A standard deviation value σ which is a concrete random number range depends on the characteristic of the printer engine 122 (see FIG. 1). An upper limit of a depends on the printer engine 122, and is about "4". In an experiment (for obtaining the matrix of FIG. 5A), σ is set to σ=1.5.

To newly prepare the threshold matrix in the present embodiment, the reference threshold matrix of FIG. 4C is synthesized with the normal random number of FIG. 5A. As a synthesizing method, for example, a method of simply adding up numbers for each threshold value (see FIG. 6) may be used. A method in which standard deviation values including an average value of 1 are appropriately selected and multiplied is also usable.

In other words, a state is prepared in which certain normal random number components are superposed with respect to the threshold values defined in a normal defined growth order. Here, a usual white reference numeral component is not used, because noise components are conspicuous in the half-toning process using the prepared threshold matrix, and a granularity is deteriorated (visually increased).

Next, the synthesized threshold values (threshold matrix) are normalized. When an 8-bit integer value is produced in the half-toning process, the threshold matrix is in a range of "1" to "255". Therefore, the threshold matrix is normalized between "1" and "255". A normalization method can be usually easily realized by usually bringing a decimal state upon which a normal random number content is superposed into an integer state by rounding-off. Additionally, the value is smaller than "1" or larger than "255" depending on the combination of the superposition of the random numbers in some case. In this case, a protruding value smaller than "1" or larger than "255" is converted into "1" or "255", and accordingly the threshold value is re-constituted between "1" and "255".

The periodicity of the newly prepared threshold matrix of the present embodiment is collapsed when an error component is subtly added to the arrangement of the threshold values constituted in a defined periodic order within each half-tone unit and between the half-tone units. Therefore, when the threshold values are randomized, an effect of preventing intensive textures from being generated can be obtained.

That is, one of the image processing apparatuses of the present invention converts the continuous gradation image into image data of M (M≧2) values by a 1 to N (N≧1) pseudo half-toning process by the use of the threshold matrix, wherein the threshold matrix has a plurality of half-tone centers, each half-tone center has an equal interval from the half-tone center in the vicinity, and the threshold matrix has lattice elements which can be addressed at a rational tangent angle. In the growth order among the half-tones, micro normal random numbers are synthesized with respect to the threshold matrix of super cells defined in a defined periodic order to thereby prepare the threshold values again.

Additionally, the components superposed (synthesized) onto the individual threshold values of the threshold matrix have a normal distribution, but sometimes take large values. Due to an influence of the superposition of the random number component having a large value, there is a possibility that the granularity slightly increases. In this case, as a further preferable example, as shown in FIG. 7A, a component having a broadly known characteristic of a blue noise may be synthesized instead of the normal random number. When the half-toning process is performed using the threshold matrix of FIG. 7A, the output characteristic of the blue noise indicates a frequency characteristic shown in FIG. 7B, and is substantially equivalent to the pattern produced by an ideal error diffusion process. It is to be noted that the threshold matrix of the blue noises shown in FIG. 7A is converted into values of a numerically synthesizable numeric range prior to the synthesis as shown in FIG. 7C (in the same manner as the normal random number described before with reference to FIG. 5A). Even when the blue noises shown in FIG. 7A (7C) are used, the synthesizing method is similar to that in a case where the normal random numbers are used.

As a result, when the error of a most visually inconspicuous blue noise component is added to the reference threshold matrix, such a threshold matrix in which the granularity is not easily perceived and the textures are inhibited from being generated can be prepared.

That is, one of the image processing apparatuses of the present invention converts the continuous gradation image into image data of M (M≧2) values by a 1 to N (N≧1) pseudo half-toning process by the use of the threshold matrix, wherein the threshold matrix has a plurality of half-tone centers, each half-tone center has an equal interval from the half-tone center in most vicinity, and the threshold matrix has lattice elements which can be addressed at a rational tangent angle. In the growth order among the half-tones, micro blue noises are synthesized with respect to the threshold matrix of super cells defined in a defined periodic order to thereby prepare the threshold values again.

Figures 8, 9A, 9B, 9C, 9D:
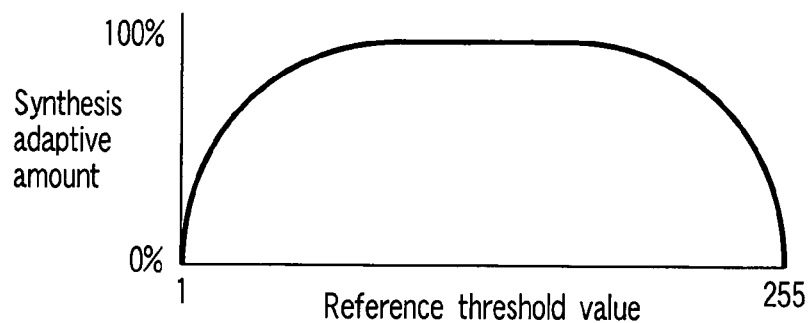
FIG. 8 is a schematic diagram showing an example in which a synthesis amount is prohibited or reduced in a highlight section as an example in which a synthesis amount of a normal random number component or a blue noise component is appropriately adjusted in accordance with a corresponding gradation value of each reference matrix.
FIGS. 9A to 9D are schematic diagrams showing an example in which a screen angle of a half-tone unit (super cell) constituting a basic of the threshold matrix described with reference to FIGS. 4C, 5A and 5B, 6A and 6B, 7A to 7C, and 8 is characterized for each color component for a color image output.

Additionally, the synthesized amount of the normal random number components or the blue noise components may be appropriately adjusted in accordance with the corresponding gradation value of each reference matrix. For example, when the half-toning process is performed using the threshold matrix by synthesis of the normal random numbers, irregularity in dot arrangement at the time of actual printing is sometimes visually conspicuous. In this case, for example, as shown in FIG. 8, the synthesis may be prohibited or reduced in the highlight section (portion having a large threshold value).

Thus, the adjusting of the synthesized amount of the normal random number or blue noise components in accordance with characteristics of the printer engine is an effective means, and can be easily realized.

In the present embodiment, the method of preparing one threshold matrix, and the half-toning process method have been described above, but in the reference half-tone, as shown in FIGS. 9A to 9D, the screen angle may be appropriately changed for each color. For example, usable screen angles are 63° for cyan (C, FIG. 9A), 27° for magenta (M, FIG. 9B), 90° for yellow (Y, FIG. 9C), 45° for black (Bk, FIG. 9D) and the like. When a new threshold matrix is prepared for each color in accordance with the procedure for preparing the threshold value, this method can be easily applied to a color threshold matrix, and a color half-toning process.

At this time, for example, as to visually inconspicuous yellow, the synthesized amount of the normal random numbers is adjusted to be small (standard deviation value is set to be small), or normal random number contents are not synthesized at all. On the other hand, as to visually conspicuous black components, the synthesized amount of the normal random numbers is increased. This method is also applicable.

Figure 10A:
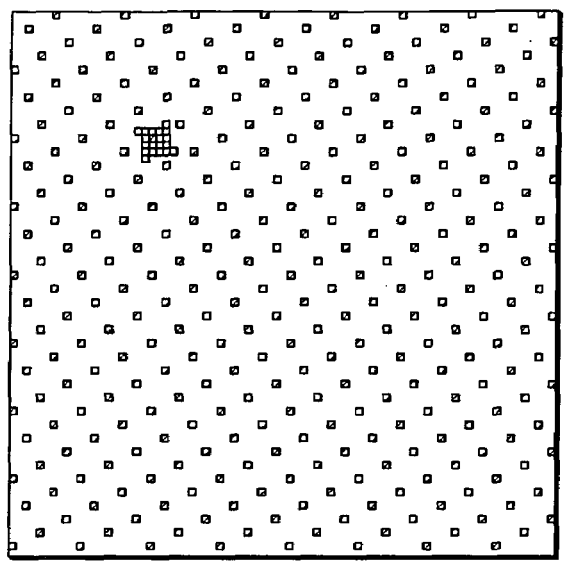
FIGS. 10A and 10B are schematic diagrams showing an example of a method of preparing the threshold matrix, in which a granularity that is sometimes visually perceived can be reduced and textures can be inhibited from being generated even in the use of a usual threshold matrix.
Figure 10B:
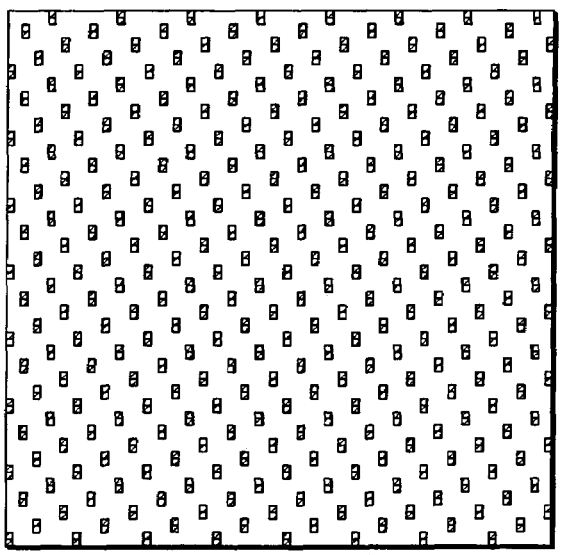

FIGS. 10A and 10B show an example of a method of preparing the threshold matrix, in which a granularity that is sometimes visually perceived can be reduced and textures can be inhibited from being generated even in a case where a usual threshold matrix is used.

In broadly used super cells (half-tone units) prepared in a standard-classic procedure, a regular pattern exists in which visual roughness and texture are not geometrically easily generated (the pattern is not perceptually ugly (most beautiful)) in a specific gradation range shown in FIG. 10A or 10B in output patterns formed by the half-toning process using the threshold matrix. On the other hand, as shown in FIG. 10C, in an intermediate gradation (which cannot be classified into either FIG. 10A or 10B) a dot size difference between the half-tones or a regular directionality constitutes a texture as shown by arrows, and an image quality remarkably deteriorates.

Figure 10C:
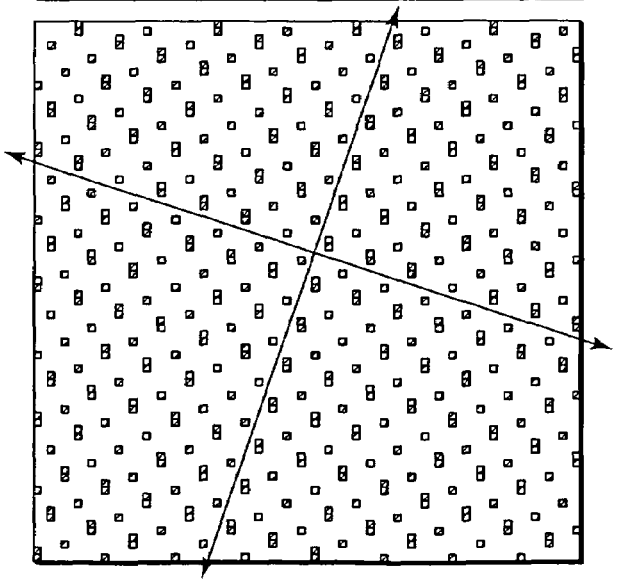
FIG. 10C is a schematic diagram showing an example of the texture sometimes generated as a result, when the method of FIGS. 9A and 9B is not used.
Figure 11A:
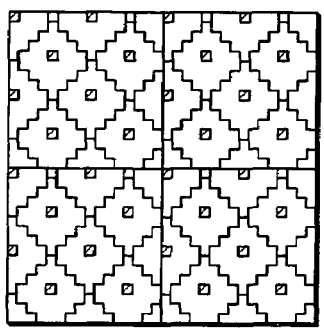
FIGS. 11A to 11I are schematic diagrams showing steps of the method of preparing the threshold matrix, in which the granularity that is sometimes visually perceived can be reduced and the textures can be inhibited from being generated even in the use of the usual threshold matrix.
Figure 11B:
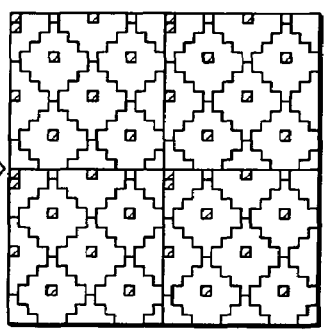
Figure 11C:
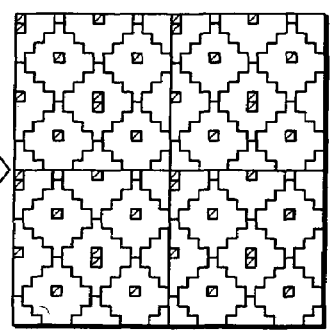
Figure 11D:
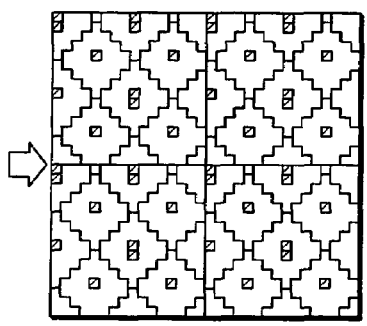
Figure 11E:
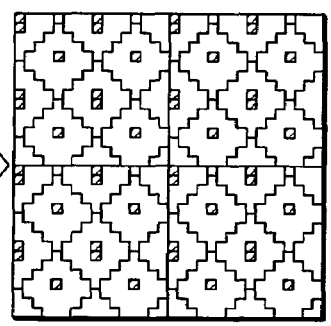
Figure 11F:
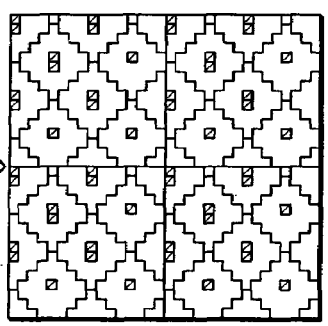
Figure 11G:
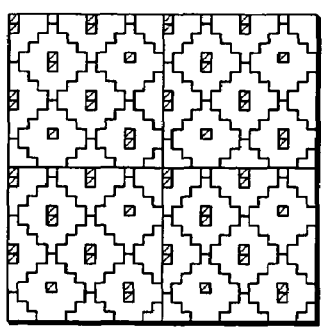
Figure 11H:
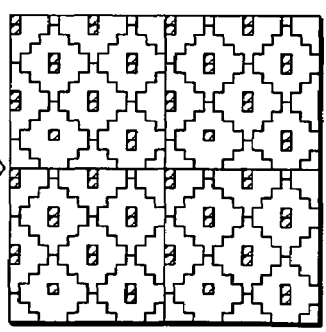
Figure 11I:
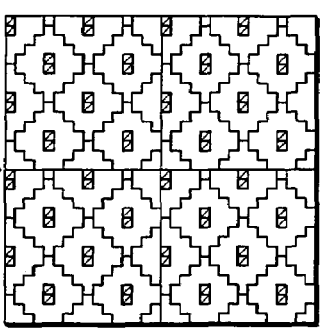

Next, a system is considered in which the textures can be inhibited from being generated in an arbitrary intermediate gradation range in which the textures are easily generated as shown in FIG. 10C between the gradations in which the geometrically arranged output pattern is intentionally held while the sizes of the half-tone dots are adjusted as shown in FIG. 10A or 10B.

Concretely, an order in which pixels are grown in the intermediate gradation range from the threshold value forming the pattern having an adjusted size of an arbitrary half-tone dot to the next threshold value forming the pattern having the adjusted size of the half-tone dot as shown in FIGS. 11A to 11I is changed in accordance with a rule described below with reference to FIGS. 12A and 12B.

As a rule, the threshold values are randomized and reassigned without changing a range to which the threshold values are assigned among the threshold values of sets (hatched threshold values in FIG. 12A) of a threshold value group forming the pattern having the adjusted size of the half-tone dot to thereby reconstruct a new threshold matrix.

Figure 12A:
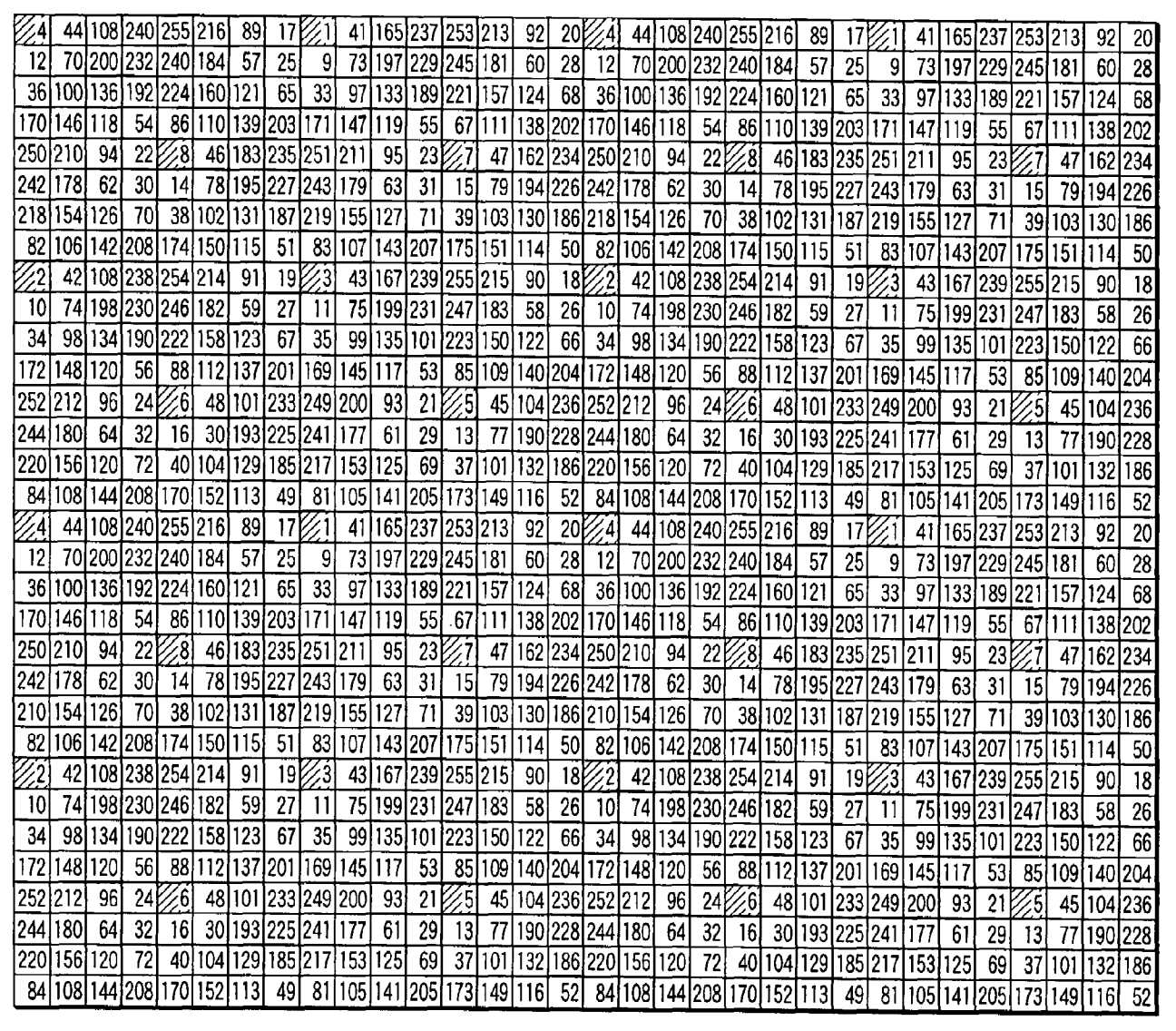

In detail, in the example of FIG. 12A which is the threshold matrix of 32×32, positions of "4", "2", "4", "2" are fixed from an upper line of a leftmost row. Similarly, concerning the row to which "1" is assigned in the uppermost line, positions of "1", "3", "1", "3" are fixed in the same manner as in the leftmost row. Similarly, as to a fifth row from the left, positions of "8", "6", "8", "6" are fixed. Subsequently, as to a ninth row from the left, positions of "7", "5", "7", "5" are fixed. It is to be noted that in this example, a ¼ part of 32×32, that is, a matrix of 16×16 is doubled with respect to both the line and row, and the super cells (half-tone units) described above with reference to FIG. 4C are held.

Figure 12B:
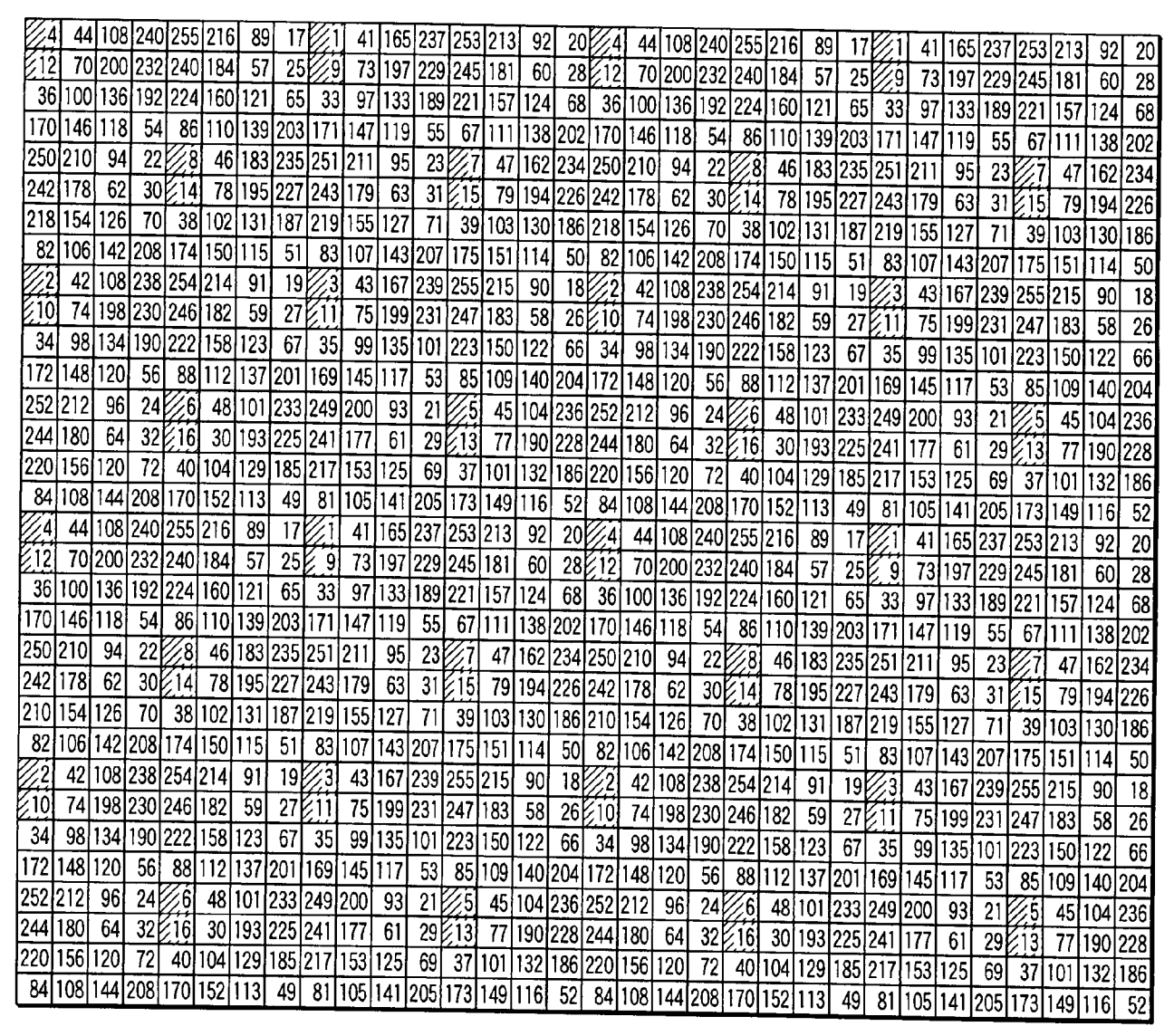

Similarly, as shown in FIG. 12B, also with respect to the threshold values of "9" to "16", the threshold values are randomized and reassigned without changing a range to which the threshold values are assigned among the threshold values to thereby reconstruct a new threshold matrix. It is to be noted that in this case, "9" to "16" is disposed adjacent to "1" to "8" in the same direction. This operation is repeated with respect to each set of the threshold value groups. This randomizing method can be realized by randomizing means for synthesizing the normal random numbers described above or by means for replacing the set of the threshold value groups at random.

Here, unlike the above-described embodiment, it is important to basically hold the set of the threshold value groups also in a certain range in which the geometrically beautiful pattern is formed by the half-toning process, and the order of the threshold values is changed in the set of the threshold value groups.

That is, one of the image processing apparatuses of the present invention converts the continuous gradation image into image data of M (M≧2) values by a 1 to N (N≧1) pseudo half-toning process by the use of the threshold matrix, wherein the threshold matrix has a plurality of half-tone centers, each half-tone center has an equal interval from the half-tone center in the vicinity, and the threshold matrix has lattice elements which can be addressed at a rational tangent angle. In the growth order of the threshold matrix, this threshold value order is held in the specific gradation value with respect to the threshold matrix of the super cells defined in a periodic order, the growth sequence is randomized in another gradation range, the threshold values are obtained again to thereby prepare the matrix.

Accordingly, an effect of suppressing intense textures in the intermediate gradation range by a randomizing effect can be expected while the most geometrically beautiful pattern is held in the specific gradation value by the half-toning process. Even in this case, when the presence of the randomizing or the randomizing order is controlled for each gradation range, optimum gradation reproduction can be easily realized in accordance with the characteristics of the printer engine. In the same manner as described with reference to FIG. 8, an optimum threshold matrix may be prepared in accordance with the characteristics of the engine by a measure for removing or reducing the randomized synthesized components by the normal random numbers in the highlight section.

Similarly, when the rearrangement process of the threshold values using the blue noises is applied as shown in FIGS. 7A to 7C instead of the threshold value order control, the threshold matrix can be prepared in such a manner that the textures are inhibited from being generated, and the granularity is suppressed. Also in this case, when the applied amount of the blue noises is appropriately controlled in each set of the threshold value groups, the gradation reproduction is possible in accordance with the characteristics of the engine.

That is, one of the image processing apparatuses of the present invention converts the continuous gradation image into image data of M (M≧2) values by a 1 to N (N≧1) pseudo half-toning process by the use of the threshold matrix, wherein the threshold matrix has a plurality of half-tone centers, each half-tone center has an equal interval from the half-tone center in its vicinity, and the threshold matrix has lattice elements which can be addressed at a rational tangent angle. In the growth order of the threshold matrix, this threshold value order is held in the specific gradation value with respect to the threshold matrix of the super cells defined in a periodic order, the growth sequence is converted into the blue noises in another gradation range, the threshold values are obtained again to thereby prepare the matrix.

As described above, according to the method of preparing the threshold matrix, and the half-toning process method of the present invention, the threshold matrix can be prepared in which the textures are prohibited from being generated, and the granularity is suppressed. Here, as shown in FIGS. 9A to 9D, in the reference half-tone, the screen angle is preferably changed for each color to thereby prepare a new threshold matrix in accordance with a procedure of preparing the threshold values for each color. Accordingly, the center threshold matrix, and the color half-toning process are easily achieved. At this time, for example, with regard to visually inconspicuous Y, the randomizing amount is adjusted to be small (sigma is reduced), and is not randomized at all. Alternatively, the visually conspicuous Bk components are synthesized with more normal random number components. Thus, various variations are considered. In this method, the synthesized amount of the normal random numbers may be appropriately adjusted in accordance with the characteristics of the engine.

It is to be noted that the method in which the basic half-tone matrix is tiled to prepare the reference threshold matrix based on the tiles has been described above, but the present invention is not limited to this method. The line number, angle, and half-tone dot shape may be designated to thereby prepare the threshold matrix which is a reference by geometric calculation.

Moreover, in the present embodiment, the 1 to 1 organized dither system half-toning method has been described, and, needless to say, the application of this method to a concentration pattern method for N (N>2) output sets per pixel of input continuous gradation can be easily realized by any one skilled in the image processing.

Similarly, in the present embodiment, the binary half-toning process has been described, and this also applies to a case where the process is applied to multi-values indicated by M values, or multi-valued reproduction by division of the pixel in pulse width modulation (PWM). That is, the procedure for preparing the threshold matrix according to the present embodiment is not restrictive, when considering the geometric shapes of one pixel simply divided by (M-1) in a two-dimensional space, and another procedure can be easily realized.

Thus, according to the present invention, even with respect to an output apparatus in which an image output having a resolution as high as that in a printer is not required, instabilities in forming an image, such as roughness and textures, causing a problem in printing image data after the half-toning process and attributed to geometric restrictions, can be improved with a very simple constitution without any restriction on the gradation number, and the process can be realized at a high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing apparatus which converts a continuous gradation image into image data of M (M≧2) values by a 1 to N (N≧1) pseudo half-tone process by the use of a threshold matrix, comprising:
    the threshold matrix has a plurality of half-tone centers and lattice elements which are addressable at a rational tangent angle, and each interval between any of the half-tone centers and its closest half-tone center being equal; and
    a growth order among half-tones is established by synthesizing micro inhomogeneous components with respect to the threshold matrix of super cells defined in a defined periodic order to set threshold values again.

2. The image processing apparatus according to claim 1, wherein in the synthesis, a synthesized amount of the micro inhomogeneous components is controlled by each reproduction gradation range.

3. The image processing apparatus according to claim 1, wherein the micro inhomogeneous components include normal random numbers.

4. The image processing apparatus according to claim 1, wherein the micro inhomogeneous components include blue noises.

5. The image processing apparatus according to claim 1, further comprising:
    a growth order of the threshold matrix, in which a threshold value order is held in a specific gradation value with respect to the threshold matrix of the super cells defined in the defined periodic order, and growth sequence is randomized in another gradation range.

6. The image processing apparatus according to claim 1, wherein the micro inhomogeneous components include normal random numbers.

7. The image processing apparatus according to claim 1, wherein the micro inhomogeneous components include blue noises.

8. A color image processing apparatus which converts a continuous gradation color image into image data of M (M≧2) values by a 1 to N (N≧1) pseudo half-tone process by the use of a threshold matrix for each color component, comprising:
    the threshold matrix of an arbitrary color has a plurality of half-tone centers and lattice elements which are addressable at a rational tangent angle, and each interval between any of the half-tone centers and its closest half-tone center being equal;
    a growth order among half-tones is established by synthesizing micro inhomogeneous components with respect to the threshold matrix of super cells defined in a defined periodic order to set threshold values again; and
    the rational tangent angle differs with each color.

9. The color image processing apparatus according to claim 8, wherein in the synthesis, a synthesized amount of the micro inhomogeneous components is controlled by each reproduction gradation range.

10. The image processing apparatus according to claim 9, wherein the micro inhomogeneous components include normal random numbers.

11. The image processing apparatus according to claim 9, wherein the micro inhomogeneous components include blue noises.

12. The image processing apparatus according to claim 9, further comprising:
    a growth order of the threshold matrix, in which a threshold value order is held in a specific gradation value with respect to the threshold matrix of the super cells defined in the defined periodic order, and growth sequence is randomized in another gradation range.

13. The image processing apparatus according to claim 12, wherein the micro inhomogeneous components include normal random numbers.

14. The image processing apparatus according to claim 12, wherein the micro inhomogeneous components include blue noises.

15. A color image processing apparatus comprising:
- a color conversion section which converts an input color signal into a color signal suitable in forming an output image onto an output medium;
- a black signal production section which extracts a component for use in reinforcing black from the signal converted into the color signal suitable in forming the output image onto the output medium by the color conversion section to produce each color signal obtained by removing the extracted component;
- a gamma conversion section which corrects gradations of the component extracted to reinforce the black by the black signal production section and each color signal in accordance with an output characteristic of a device for use in forming the output image; and
- a pseudo gradation processing section which successively grows a threshold matrix including a plurality of half-tone centers, each half-tone center having an equal distance to its closest half-tone center, and each threshold matrix having lattice elements addressable at a rational tangent angle and which synthesizes micro inhomogeneous components with an arbitrary threshold value.

16. The color image processing apparatus of claim 15, wherein the micro inhomogeneous components include normal random numbers.

17. The color image processing apparatus of claim 15, wherein the micro inhomogeneous components include blue noises.

18. A method for processing an image which converts a continuous gradation image into image data of M ($M \geq 2$) values by a 1 to N ($N \geq 1$) pseudo half-tone process by the use of a threshold matrix defined in a predetermined periodic order, comprising:
- successively growing the threshold matrix, the threshold matrix including a plurality of half-tone centers, each half-tone center having an equal distance to its closest half-tone center, and each threshold matrix having lattice elements addressable at a rational tangent angle; and
- synthesizing micro inhomogeneous components to each of the threshold matrix.

19. The method according to claim 18, wherein the micro inhomogeneous components include normal random numbers.

20. The method according to claim 18, wherein the micro inhomogeneous components include blue noises.

* * * * *